United States Patent
Parkinson

(10) Patent No.: US 8,567,724 B2
(45) Date of Patent: Oct. 29, 2013

(54) FORWARD EXTRACTION FORCE TRANSFER COUPLING

(75) Inventor: Stephen T. Parkinson, Suffield, CT (US)

(73) Assignee: Capewell Components Company, LLC, South Windsor, CT (US)

( * ) Notice: Subject to any disclaimer, the term of this patent is extended or adjusted under 35 U.S.C. 154(b) by 253 days.

(21) Appl. No.: 13/170,694

(22) Filed: Jun. 28, 2011

(65) Prior Publication Data

US 2011/0318097 A1 Dec. 29, 2011

Related U.S. Application Data

(60) Provisional application No. 61/359,034, filed on Jun. 28, 2010.

(51) Int. Cl.
B64D 1/12 (2006.01)

(52) U.S. Cl.
USPC ............................................. 244/137.3

(58) Field of Classification Search
USPC .................... 244/137.3, 137.1, 118.1, 142
See application file for complete search history.

(56) References Cited

U.S. PATENT DOCUMENTS

| | | | | |
|---|---|---|---|---|
| 3,457,603 | A | | 7/1969 | Romanzi, Jr. et al. |
| 3,759,562 | A | | 9/1973 | Keich et al. |
| 4,241,890 | A | * | 12/1980 | Pearson ................. 244/137.3 |
| 4,291,852 | A | * | 9/1981 | Simmons ................. 244/147 |
| 4,303,213 | A | | 12/1981 | Bolender et al. |
| 4,379,535 | A | * | 4/1983 | Baldwin et al. ........... 244/137.3 |
| 4,395,172 | A | * | 7/1983 | Hoener et al. ............... 410/84 |
| 4,398,686 | A | | 8/1983 | Leger et al. |
| 4,428,551 | A | * | 1/1984 | Woram et al. ........... 244/137.3 |
| 4,651,957 | A | | 3/1987 | Minnich, II |
| 5,697,581 | A | * | 12/1997 | Conroy et al. ........... 244/137.3 |
| 6,241,190 | B1 | * | 6/2001 | Lunsford et al. ........... 244/137.3 |

OTHER PUBLICATIONS

International Preliminary Report on Patentability dated Dec. 28, 2012.

* cited by examiner

*Primary Examiner* — H. Gutman
(74) *Attorney, Agent, or Firm* — Alix, Yale & Ristas, LLP

(57) ABSTRACT

An extraction force transfer coupling device is particularly adapted for use with certain cargo aircraft systems for aerial delivery of a load. The extraction force transfer coupling device employs a drop arm which prevents inadvertent actuation of the actuator arm. Prior to aerial delivery, the actuator arm is obstructed by the drop arm. When the platform is forwardly extracted from the aircraft, the drop arm slides along and eventually disengages from the aircraft floor which eventually results in actuation of the cable release to provide for opening of a suspension parachute.

5 Claims, 6 Drawing Sheets

FORWARD EXTRACTION FORCE TRANSFER COUPLING

CROSS-REFERENCE TO RELATED APPLICATION

This application claims the priority of U.S. Provisional Patent Application No. 61/359,034 filed on Jun. 28, 2010, the disclosure of which is incorporated herein in its entirety.

BACKGROUND

This disclosure relates generally to extraction force transfer coupling systems which employ the force of an extraction parachute during the aerial delivery process to control the openings of suspension parachutes. More particularly, this disclosure relates to extraction force transfer coupling devices which employ an actuator arm.

In aerial delivery systems for which the present disclosure has particular application, a parachute is employed to extract a platform supporting a cargo safely from the aircraft. The extraction parachute is neither sufficiently large nor properly oriented to effect safe landing of the cargo. Additional larger suspension parachutes are required to suspend the platforms generally horizontally during the aerial delivery.

In order to provide a drop sequence for the parachutes, an extraction force transfer coupling is conventionally employed. The extraction force transfer coupling functions as a latch which releases the extraction parachute from its extraction mode and allows the extraction parachute to open the suspension parachutes. The extraction force transfer coupling employs an actuating lever or arm which engages along the side rail of the aircraft cargo handling system. Prior to aerial delivery, the actuating lever is prevented from inadvertent operation of the extraction force transfer coupling. Once clear of the aircraft, the actuating lever is free to rotate and actuate the extraction force transfer coupling system. The conventional extraction force transfer coupling system has been found to work well on a wide range of military cargo aircraft which use a common 108 inch wide cargo handling system. However, for aircraft which use an 88 inch wide system and which are used for aerial delivery, the conventional extraction force transfer coupling latch system is not capable of practical operation due to the aircraft configuration and furniture disposed atop the side rails.

SUMMARY

Briefly stated, a forward extraction force transfer coupling comprises a housing which is mountable to a forward edge portion of a platform. A cylinder with a control rod is mounted in the housing. A cable is received by the housing. A crank is pivotally connected to the control rod and connected to the cable. An actuator arm is rotatably mounted for rotation at the exterior of the housing and rotatably connected to the crank. The crank and the cable are displaceable in response to rotation of the actuator arm. A drop arm is mounted to the base for preventing rotation of the actuator arm in a first position and is pivotable from the first position to allow rotation of the actuator arm.

The drop arm and the actuator arm pivot about axes which are orthogonal to each other. The drop arm includes a transversely extending rod and an inclined toe. The drop arm also comprises an angled member which connects with an extension having an enlarged portion. The platform has a forward portion wherein the forward extraction force transfer coupling is mounted to the forward portion.

DETAILED DESCRIPTION

With reference to the drawings wherein like numerals represent like parts throughout the several Figures, an extraction force transfer coupling ("EFTC") device designated generally by the numeral 10 is particularly adapted for use in connection with an 88 inch cargo aircraft system for aerial delivery of the load.

Figure 1:
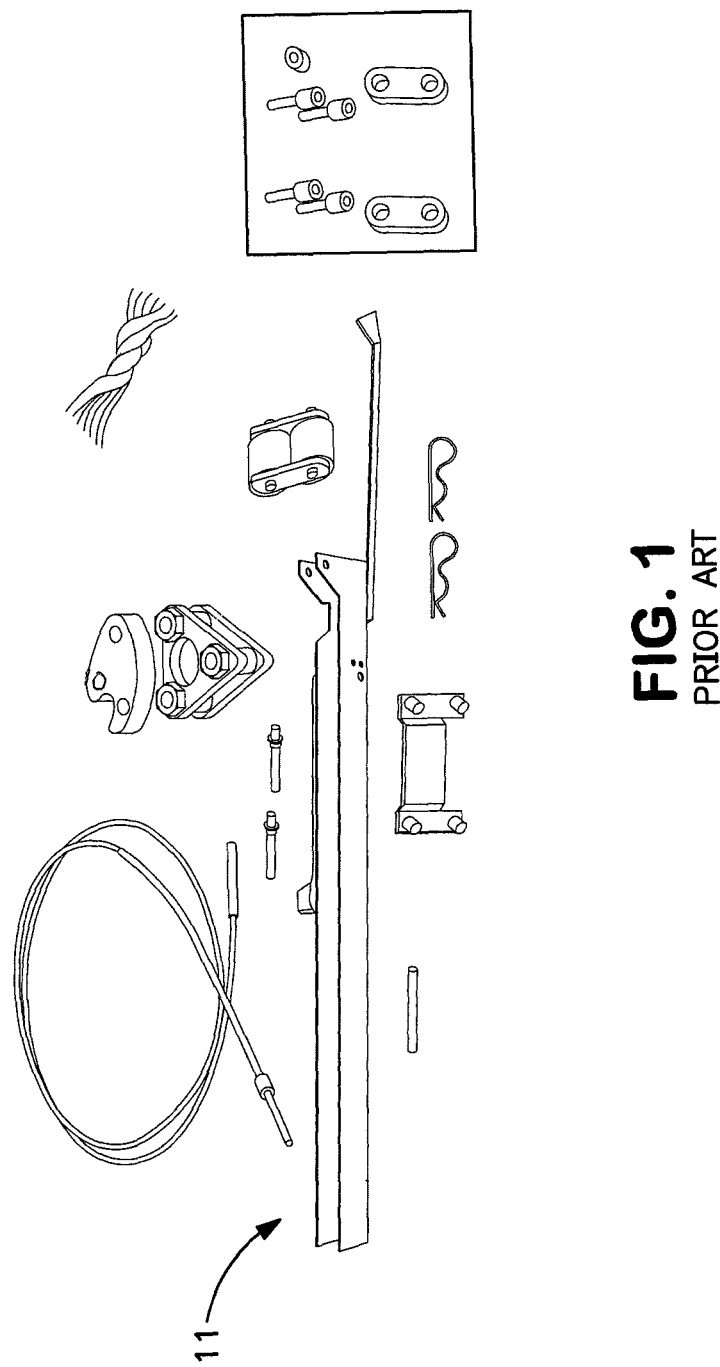
FIG. 1 is an annotated diagram of the components of a prior art extraction force transfer coupling system.
Figure 2:
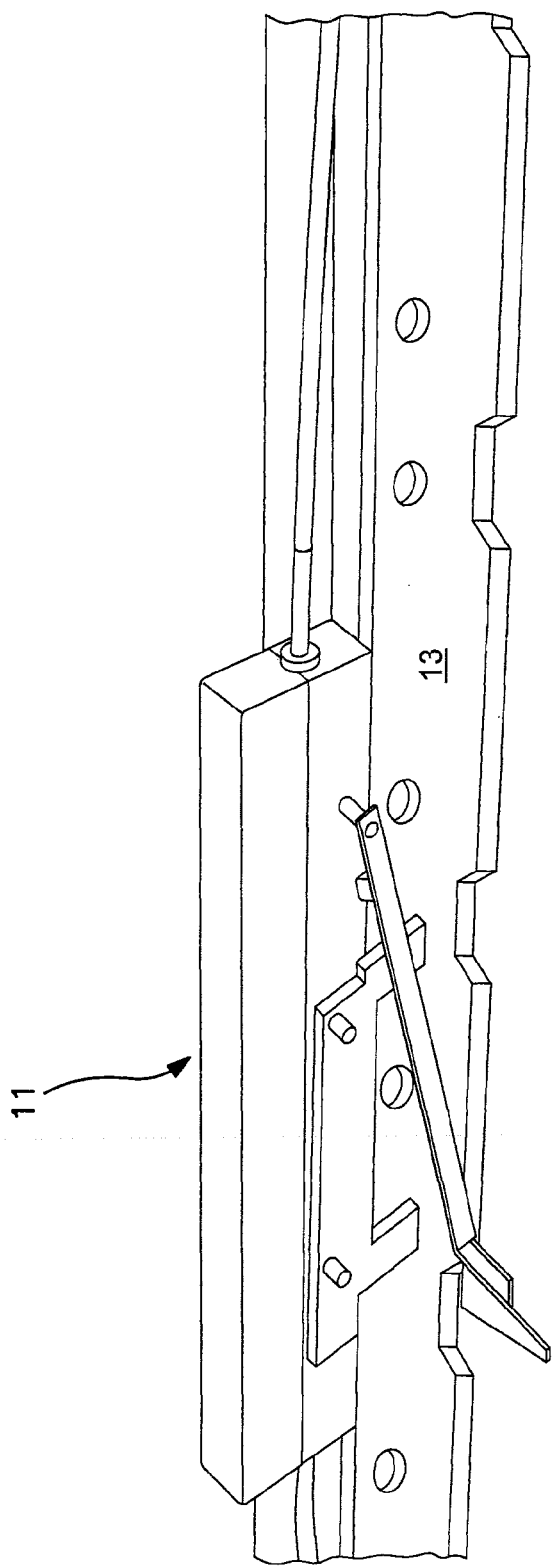
FIG. 2 is a perspective view of a prior art extraction force transfer coupling device mounted to the side of a Type V platform.

Conventional EFTC devices, such as that depicted as reference numeral 11 in FIGS. 1 and 2, mount at the side 13 of a Type V platform 12 and are typically employed in 108 inch cargo aircraft systems. As opposed to a conventional EFTC device 11, EFTC device 10 is adapted to mount to the forward end 14 of the Type V platform 12. The platforms 12 are typically loaded on tracks 16 of rollers which are mounted to the aircraft floor 18. The EFTC device 10 controls the transfer of the parachute force from extraction of the load on the platform to suspension during the aerial delivery process. The EFTC device 10 is essentially a latch which, by means of a cable 20, releases the extraction parachute (not illustrated) from the extraction mode and allows the extraction parachute to open the suspension parachutes (not illustrated).

Figure 3:
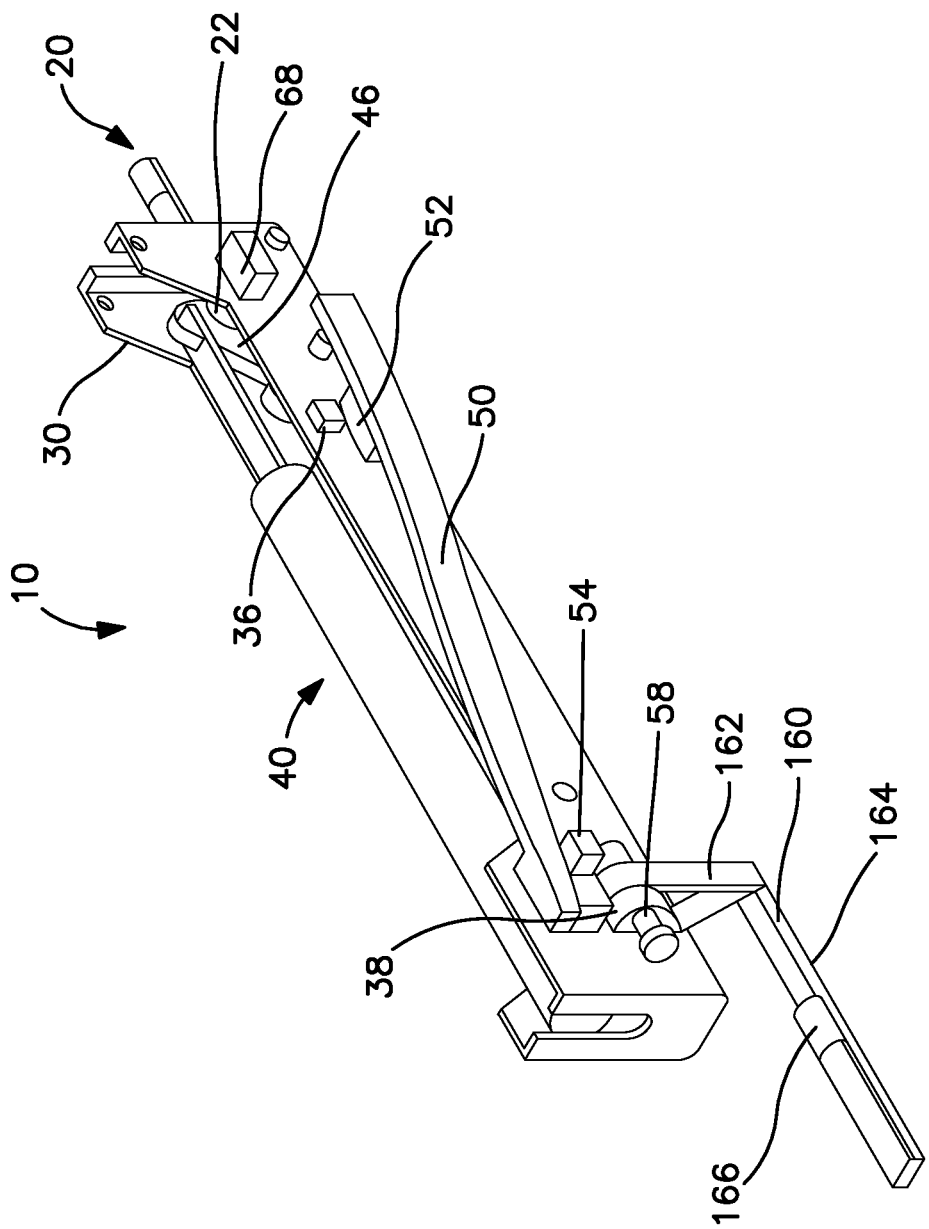
FIG. 3 is a perspective view of a forward extraction force transfer coupling device.
Figure 4:
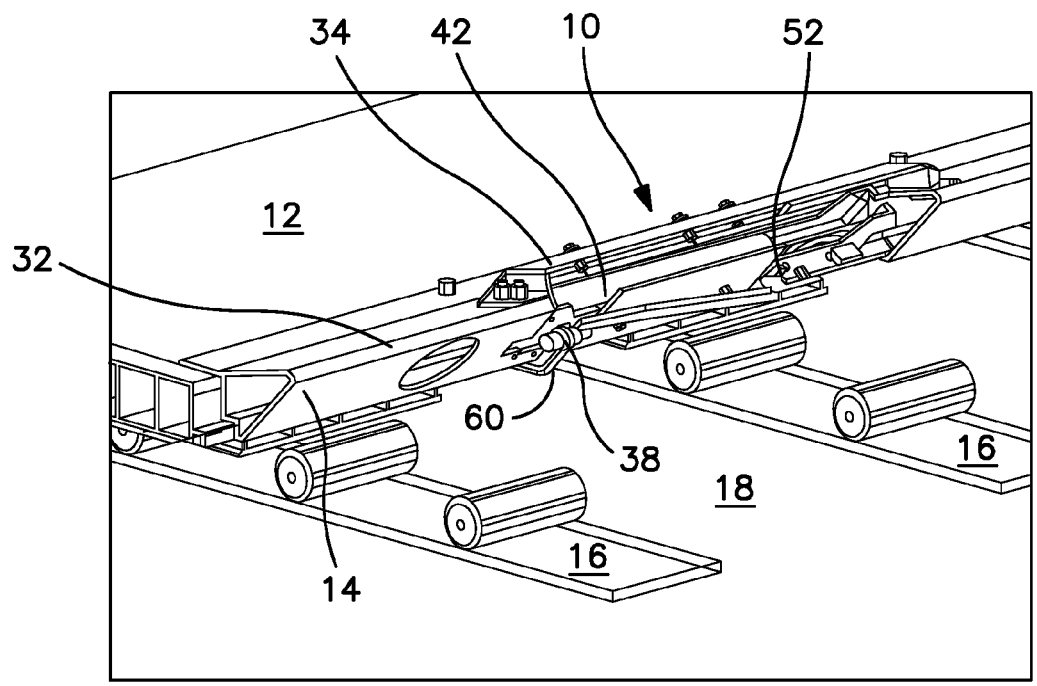
FIG. 4 is a perspective view, portions removed, of the extraction force transfer coupling device as mounted to a forward portion of a rail for a Type V platform.
Figure 5:
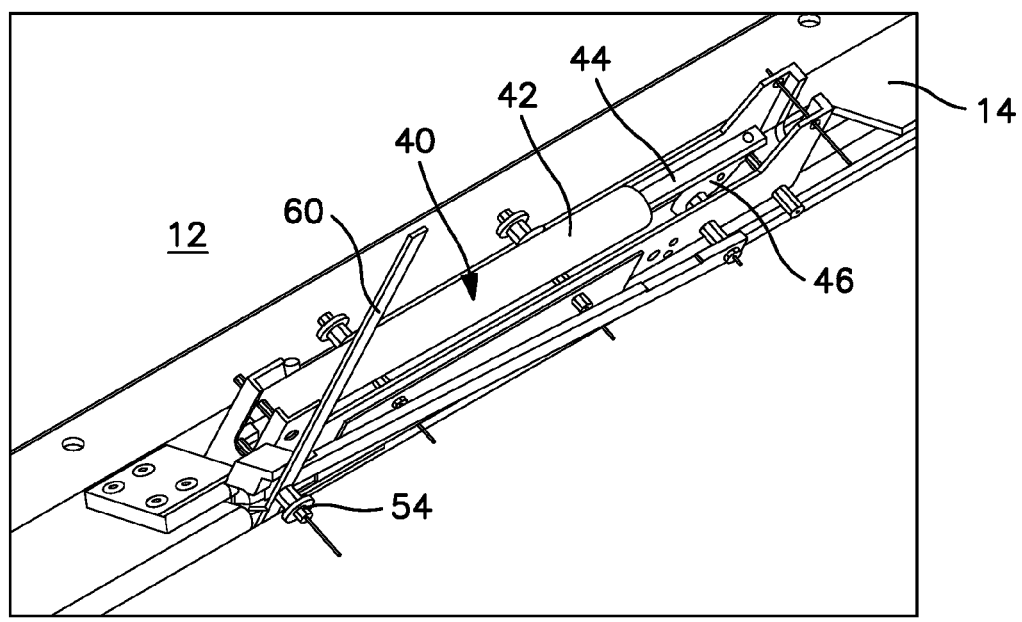
FIG. 5 is a second embodiment of an extraction force transfer coupling device as mounted to a forward portion of a rail for a Type V platform.
Figure 6:
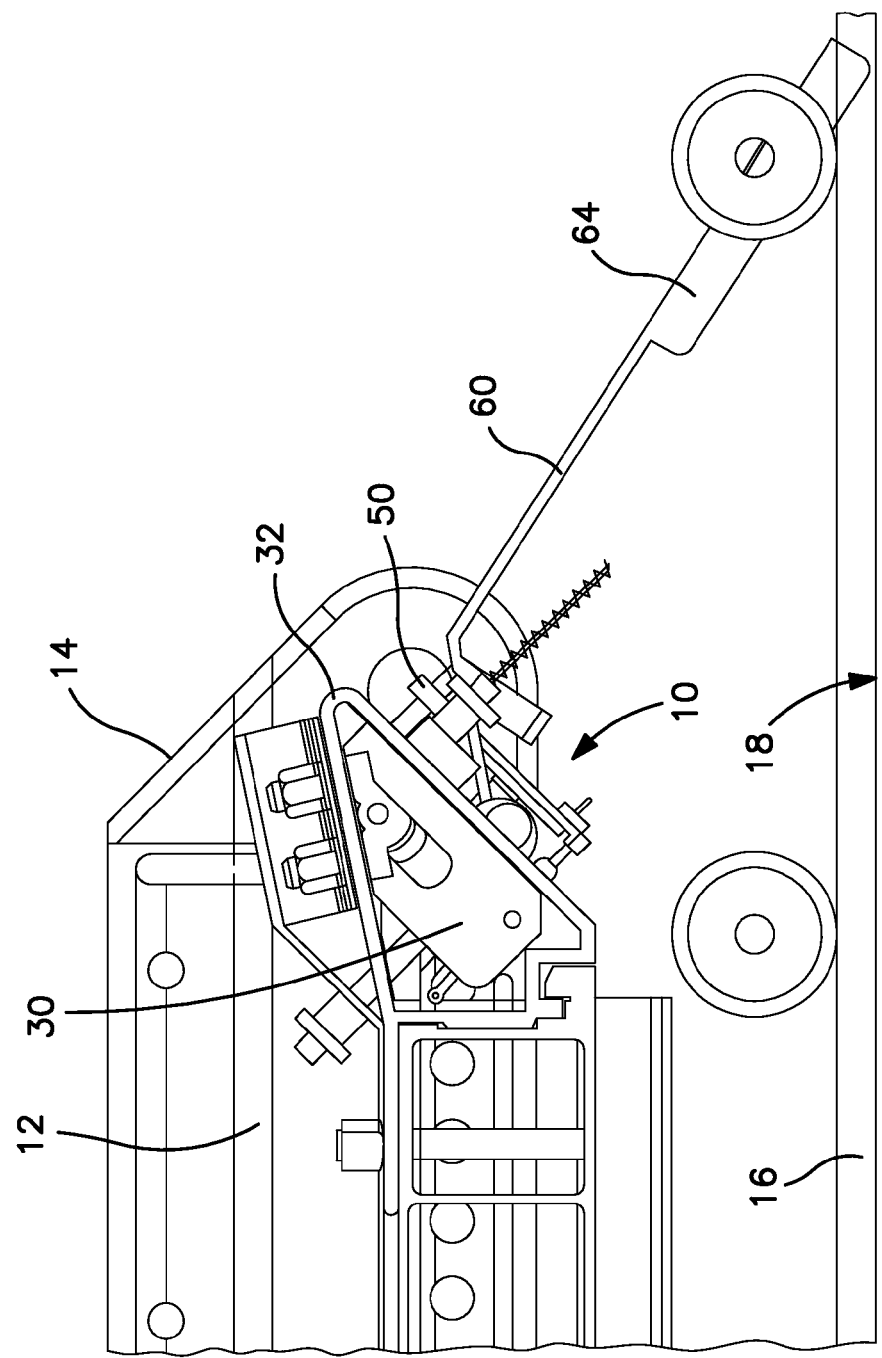
FIG. 6 is a side interior view, partly in section and portions removed, of the extraction force transfer coupling device of FIG. 4 in an unactuated mounting configuration in an aircraft.

The EFTC device 10 includes an elongated frame-like housing 30 which is mounted across a portion of the front end of the Type V platform and protected by the nose bumper 32. The housing 30 may have a cover 34 (not illustrated in FIG. 3). The housing 30 houses an elongated actuator 40. The actuator includes a control cylinder 42 with a displaceable rod 44 which pivotally connects with a crank 46. The crank 46 receives the clevis 22 of the cable. The clevis 22 is attached to the actuator crank 46 via a straight pin and cotter pin.

An elongated lever-like actuator arm 50 connects in a rotatably fixed connection with the crank. Rotation of the actuator arm 50 in a counterclockwise direction (as viewed in FIGS. 3-5 and 7A-7D) causes the cable 20 to be actuated.

The actuator arm 50 extends along the exterior forward side of the housing 30 and, at one end, is rotatably mounted to the housing for rotating the actuator crank 46. A stop block 36 extends outwardly from the housing above a stop 52 protruding rearwardly from the actuator arm to provide an upward stop of the actuator arm 50. The actuator arm 50 is biased to rotate counterclockwise (as viewed in FIGS. 3-5 and 7A-7D). An actuator arm locking pin 54 is inserted into the side of the housing at a rear portion therein for locking the actuator arm in a fixed unactuated position.

A drop arm 60 prevents inadvertent actuation of the actuator arm 50. A bifurcated lug or pair of lugs 38 extends from the frame exterior and includes transverse openings for receiving a drop arm retention pin 58. The drop arm 60 is pivotally mounted by the pin 58 to the lug 36 to provide for a pivotal motion about the transverse pin 58. The drop arm 60 is configured to allow the EFTC device to effectively function on the floor of the aircraft. The drop arm 60 includes a dual leg angled bracket 62 configured at one leg end to receive the retention pin 58 and at the other leg end to limit pivoting of the arm. A paddle-like end piece 64 projects generally outwardly from the bracket. The drop arm 60 pivots to rest against the floor 18 of the aircraft and extends from the forward end of the platform.

Modified drop arm 160 (FIG. 3) is adapted for rough floors of the aircraft. An elongated rod 164 extends orthogonally from an angled bracket vertex 162 and connects with an angled toe 166 for engaging and sliding along the floor.

Figure 7A:
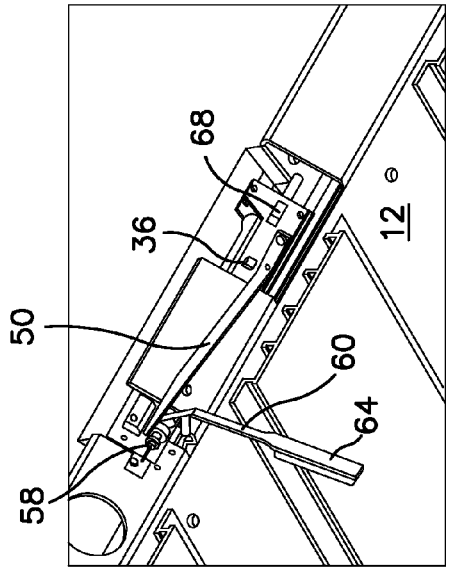
FIGS. 7A-7D sequentially show the position of the drop arm and the actuator arm during the aerial delivery sequence for the extraction force transfer coupling system of FIG. 3.
Figure 7B:
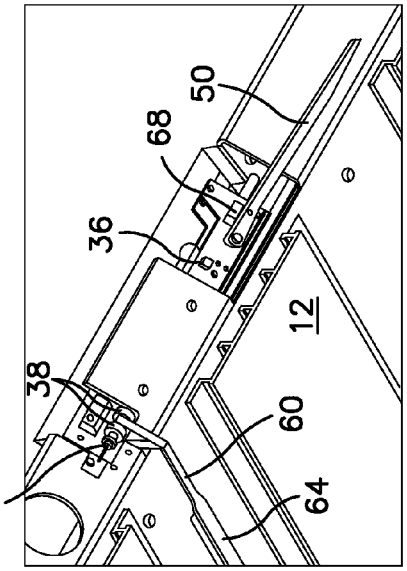
Figure 7C:
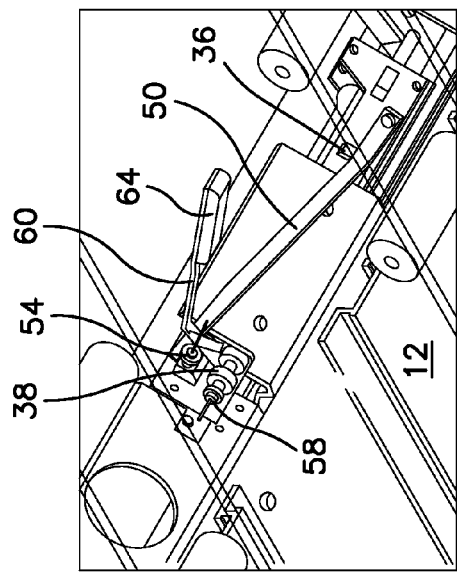
Figure 7D:
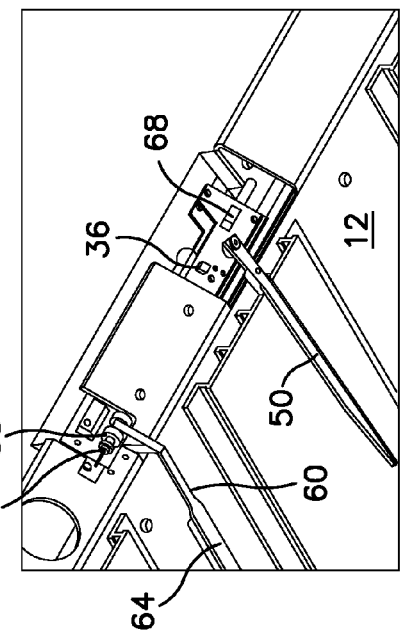

The actuating arm pin 54 is removed in the aircraft. Prior to aerial delivery, the actuator arm 50 is rotatably obstructed by the drop arm 60. As best illustrated in FIG. 7A, when the platform is in the aircraft, the actuator arm 50 engages against the drop arm and counterclockwise rotation is prevented. With additional reference to FIGS. 7B-7D, when the platform 12 is extracted (forwardly) from the aircraft, the drop arm 60 slides along and eventually disengages from the floor. The actuator arm 50 pivots over the drop arm and clears the drop arm, as best illustrated in FIG. 7C. The drop arm 60 continues pivoting until the actuator arm 50 rotates to the stop position against stop 68 of FIG. 7D. The rotation of the actuator arm 50 rotates the crank 46 and actuates the cable release which ultimately provides for the opening of the suspension parachutes.

The invention claimed is:

1. A forward extraction force transfer coupling comprising:
   a housing mountable to a forward edge portion of a platform;
   a cylinder with a control rod mounted in said housing;
   a cable received by said housing;
   a crank pivotally connected to said control rod and connected to said cable;
   an actuator arm rotatably mounted for rotation at the exterior of said housing and rotatably connected to the crank;
   said crank and said cable being displaceable in response to rotation of said actuator arm; and
   a drop arm mounted to said base for preventing rotation of the actuator arm in a first position and pivotable from said first position to allow rotation of said actuator arm.

2. The forward extraction force transfer coupling of claim 1 wherein said drop arm and said actuator arm pivot about axes which are orthogonal to each other.

3. The forward extraction force transfer coupling of claim 1 wherein said drop arm includes a transversely extending rod and an inclined toe.

4. The forward extraction force transfer coupling of claim 1 wherein said drop arm comprises an angled member which connects with an extension having an enlarged portion.

5. The forward extraction force transfer coupling of claim 1 and further comprising a platform with a forward portion, said forward extraction force transfer coupling is mounted to said forward portion.

* * * * *